(12) United States Patent
Chang et al.

(10) Patent No.: US 9,563,691 B2
(45) Date of Patent: *Feb. 7, 2017

(54) PROVIDING SEARCH SUGGESTIONS FROM USER SELECTED DATA SOURCES FOR AN INPUT STRING

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 200 days.

This patent is subject to a terminal disclaimer.

(21) Appl. No.: 14/489,400

(22) Filed: Sep. 17, 2014

(65) Prior Publication Data

US 2015/0006565 A1    Jan. 1, 2015

Related U.S. Application Data

(63) Continuation of application No. 13/907,618, filed on May 31, 2013, now Pat. No. 9,262,512.

(51) Int. Cl.
*G06F 17/30* (2006.01)
*G06F 15/177* (2006.01)
*G06F 15/173* (2006.01)

(52) U.S. Cl.
CPC ......... *G06F 17/3064* (2013.01); *G06F 15/173* (2013.01); *G06F 15/177* (2013.01); *G06F 17/30392* (2013.01); *G06F 17/30985* (2013.01)

(58) Field of Classification Search
None
See application file for complete search history.

(56) References Cited

U.S. PATENT DOCUMENTS

| | | | |
|---|---|---|---|
| 7,289,983 | B2 | 10/2007 | Best et al. |
| 7,487,144 | B2 | 2/2009 | Shakib et al. |
| 7,840,589 | B1 | 11/2010 | Holt et al. |
| 7,890,526 | B1 | 2/2011 | Brewer et al. |
| 8,001,140 | B2 | 8/2011 | Dexter |
| 8,010,537 | B2 | 8/2011 | Prasad Kantamneni et al. |
| 2009/0070318 | A1 | 3/2009 | Song et al. |
| 2010/0325136 | A1 | 12/2010 | Chaudhuri et al. |
| 2011/0093488 | A1 | 4/2011 | Amacker et al. |
| 2011/0208723 | A1 | 8/2011 | Nicks et al. |
| 2012/0254143 | A1 | 10/2012 | Varma et al. |

(Continued)

OTHER PUBLICATIONS

Response to Office Action 1, Sep. 21, 2015, for Application No. US13907618, filed on May 31, 2013 by B.W. Chang et al., Total 11 pp. [57.312 (ROA1)].

(Continued)

*Primary Examiner* — Wilson Lee
(74) *Attorney, Agent, or Firm* — David W. Victor; Konrad, Raynes, Davda & Victor LLP

(57) ABSTRACT

Provided are a computer program product for generating suggestions for an input string. A determination is made of strings in a user selected data source having at least a substring matching an input string, from a computer implemented user interface, comprising at least one character for use by a computer implemented process. The determined strings are provided to the user interface and selection is received of one of the determined strings from the user interface to provide to the computer implemented process.

10 Claims, 6 Drawing Sheets

(56) References Cited

U.S. PATENT DOCUMENTS

2012/0278308 A1    11/2012  Zhou
2014/0280290 A1     9/2014  Baumgartner et al.

OTHER PUBLICATIONS

Notice of Allowance, Oct. 23, 2015, for U.S. Appl. No. 13/907,618, filed May 31, 2013 by B.W. Chang et al., Total 7 pp. [57.312 (NOA)].

Hoeber, O., and H. Liu, "Comparing Tag Clouds, Term Histograms, and Term Lists for Enhancing Personalized Web Search", 2010 IEEE/WIC/ACM International Conference on Web Intelligence and Intelligent Agent Technology, © 2010 IEEE, Total 5 pp.

Preliminary Amendment, Sep. 17, 2014, for U.S. Appl. No. 13/907,618, filed Mar. 31, 2013 by B.W. Chang et al., Total 7 pp. [57.312 (PrelimAmend)].

Sullivan, D., "How Google Instant's Autocomplete Suggestions Work", [online], [Retrieved on Apr. 14, 2013]. Retrieved from the Internet at <URL: http://searchengineland.com/how-google-instant-autocomplete-suggestio . . . >, Apr. 6, 2011, Total 11 pp.

Thollot, R., N. Kuchmann-Beauger, and M. Aufaure, "Semantics and Usage Statistics for Multi-dimensional Query Expansion", DASFAA 2012, Part 2, © Springer-Verlag Berlin Heidelberg 2012, Total 11 pp.

U.S. Patent Application with U.S. Appl. No. 13/907,618, filed May 31, 2013, entitled, "Providing Search Suggestions From User Selected Data Sources for an Input String", invented by B.W. Chang et al., Total 28 pp. [57.312 (Appln)].

Office Action 1, Jun. 19, 2015, for U.S. Appl. No. 13/907,618, filed May 31, 2013 by B.W. Chang et al., Total 20 pp. [57.312 (OA1)].

PROVIDING SEARCH SUGGESTIONS FROM USER SELECTED DATA SOURCES FOR AN INPUT STRING

CROSS-REFERENCE TO RELATED APPLICATION

This application is a continuation of U.S. patent application Ser. No. 13/907,618, filed May 31, 2013, which application is incorporated herein by reference in its entirety.

BACKGROUND OF THE INVENTION

1. Field of the Invention

The present invention relates to a computer program product, system, and method for providing search suggestions from user selected data sources for an input string.

2. Description of the Related Art

When a user enters characters for an input string for purposes such as a search, the computer program may provide the user a completed search string from a dictionary or other source to auto-complete the string the user is entering. For instance, when a user enters a search string in a search box on a web page, such as the GOOGLE® search box at the GOOGLE® web site, the GOOGLE® search engine may display to the user search suggestions to complete the search string. The suggestions GOOGLE® provides may be based on popular searches performed by other users. Other programs, such as word processing programs, email and text message programs may provide auto-complete suggestions based on a dictionary. (GOOGLE is a registered trademark of Google Inc.)

SUMMARY

Provided are a computer program product for generating suggestions for an input string. A determination is made of strings in a user selected data source having at least a substring matching an input string, from a computer implemented user interface, comprising at least one character for use by a computer implemented process. The determined strings are provided to the user interface and selection is received of one of the determined strings from the user interface to provide to the computer implemented process.

DETAILED DESCRIPTION

Described embodiments provide techniques to offer suggestions for an input string entered by a user for the user to select to use with a computer implemented process, such as a search engine. As the user inters a search string, the string or substring the user entered is processed to determine strings in a user selected data source having at least a substring matching the input string. The determined strings from the user selected data source, such as a database, document, list, etc., are provided to the user interface for the user to select one of the determined strings. The determined string the user selects is then provided to the computer implemented process to use, such as to execute a search request for which the input string was being entered.

Figure 1:
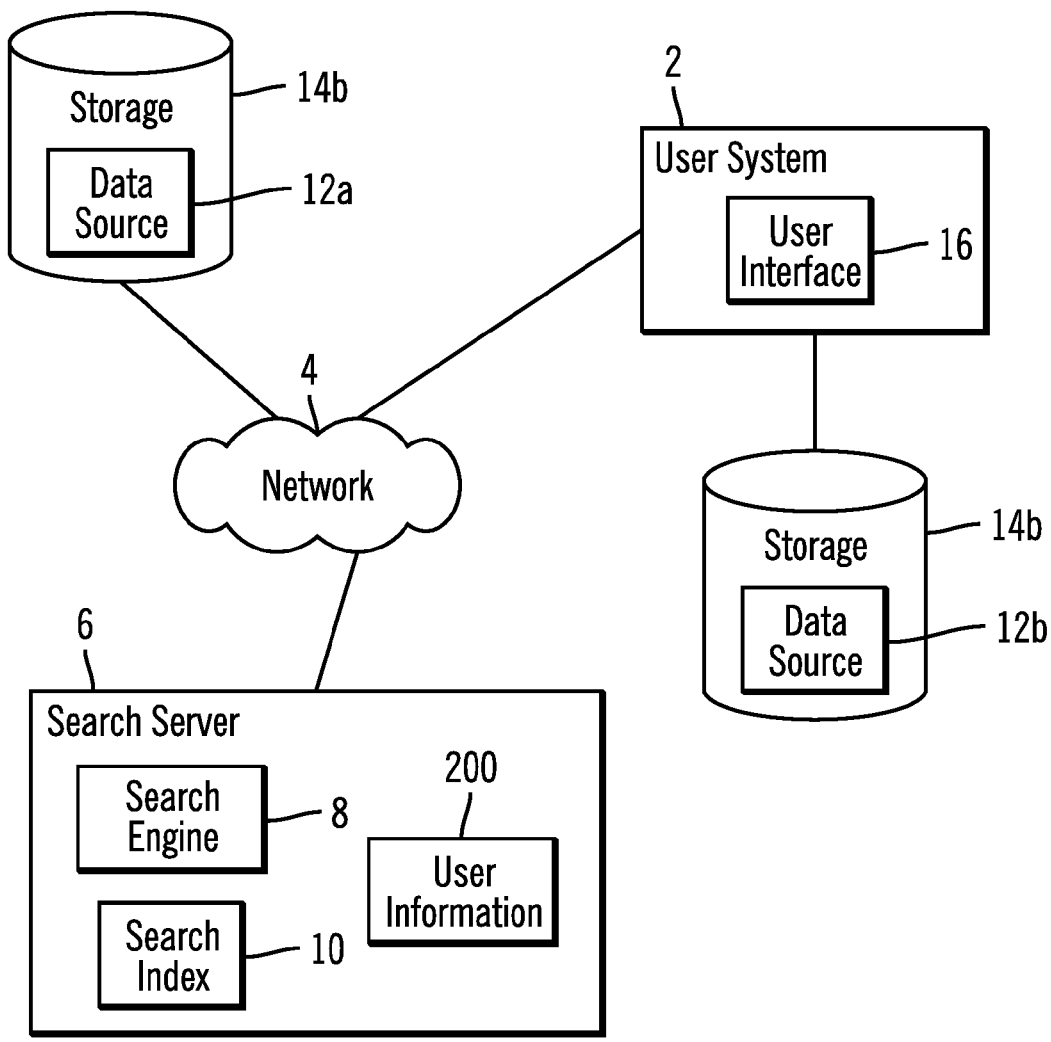
FIG. 1 illustrates a computing environment in which embodiments are implemented.

FIG. 1 illustrates a network computing environment having a plurality of user systems or clients 2 that may submit queries over a network 4 to a search server 6 to search network accessible systems for objects that satisfy the search query predicates. The server 6 includes a search engine 8 to receive, execute, and return results for user 2 search queries. The search engine 8 maintains a search index 10 used to determine objects that satisfy the search request. The search index 10 may provide an association of strings, comprising characters and numbers, to the documents, where the strings associated with an object may comprise content in the object. In one embodiment, the search index 10 may comprise a plurality of posting lists that include document identifiers, such as a network address or document identifier, e.g., Uniform Resource Locator (URL), docID, etc., of documents that include the term, i.e., word, number, etc., associated with that posting list 14. The term(s) associated with a posting list may comprise a word or combination of words on which users search. The search engine 8 may include a crawler to collect documents from the network and an indexer to extract the searchable terms, including numeric words and values, from the documents and builds posting lists.

The search server 6 may further maintain user information 20 including information on users, such as user selected data sources 12a, 12b, that may be used to provide search suggestions of search terms to provide as the user types in characters in a search box to allow the autocomplete based on characters the user enters in a search box. The data sources 12a, 12b used to provide search suggestions may include a data source 12a in a storage 14a coupled to the network 4 or a data source 12b in a storage 14b coupled to or included in the user system 2. The data sources 12a, 12b that may be searched for search suggestions to auto complete a user entered search string may comprise a database, where the suggestions are determined through a Structured Query Language (SQL) query of the data source 12a, 12b, a word processing file, a spreadsheet, a text file, etc. In this way, search suggestions may comprise strings from data sources 12a, 12b specified by a user to the search engine 8.

The user system 2 may comprise any computing device capable of submitting queries, i.e., search requests, to the server 6, including desktop computers, notebook computers, workstations, hand held computers, servers, mainframes, telephony devices, etc. The user systems 2 may include a user interface 16, such as a browser program e.g., as a Hypertext Markup Language (HTML) web browser, capable of requesting and accessing documents at network accessible systems and submitting search requests to the server 6. The network 4 may comprise one or more networks known in the art, such as a Wide Area Network (WAN), Local Area Network (LAN), Storage Area Network (SAN), wireless network, the Internet, and Intranet, etc. The server 6 may comprise one or more computational machines, such as one or more servers, suitable for handling search requests from the user systems 2. The number of servers used for the server 6 depends on the anticipated network traffic from user systems 2.

The systems on the network 4 having documents that may be indexed in the search index 10 may comprises any computational device or storage system capable of storing documents and making such documents available to the user systems 2 and server 6 over the network 4. The network accessible systems includes a program to respond to document requests from the user systems 2 and server 6 over the network 4, such as a Hypertext Transfer Protocol (HTTP), File Transfer Protocol (FTP), Network File System (NFS), etc.

The documents that the user interface 16 may search and that are indexed in the search index 10 available over the network 4, may be implemented in different computer readable formats, e.g., text, HTML, images, video, sound, Portable Document Format (PDF), and include searchable text or searchable metadata that the server 6 may access to index in the search index 10.

In one embodiment, the documents that the search server 6 may return in a list of search results may comprise documents available over the Internet in public networks. In an alternative private Intranet, the documents that the search sever 6 may return may comprise documents located in systems in a private Intranet accessible only to authorized users.

Figure 2:
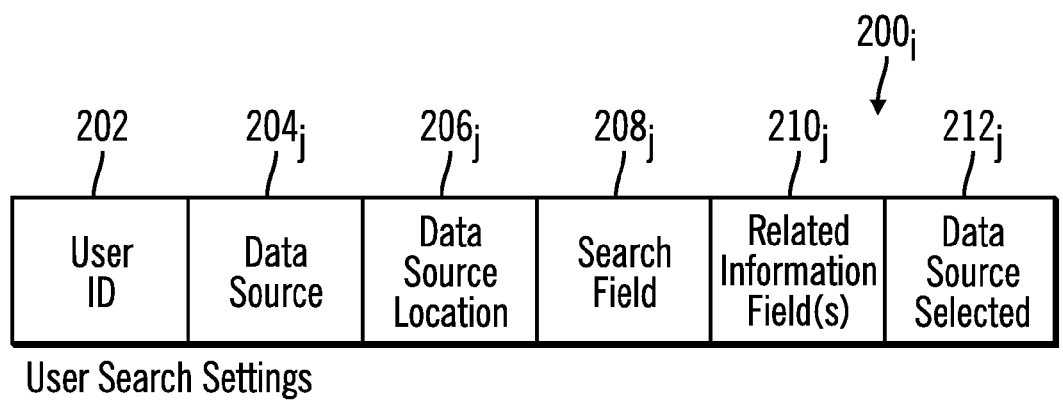
FIG. 2 illustrates an embodiment of user search settings.

FIG. 2 illustrates an embodiment of an instance of user search settings $200_i$ for one user included in the user information 200, having a user identifier 202, and zero or more instances j of data source information. Each instance j of data source information may include a data source $204_j$, such as a database or file having information; a data source location $206_j$ comprising a location of the data source $204_j$, such as a network address and other information to access the data source; a search field $208_j$ indicating a field, column, attribute, etc., in the data source $204_j$ to search for search suggestions based on a user input string, which may be just the beginning of a word the user is typing; one or more related information $210_j$ fields indicating related information in the data source $204_j$ or some other location to include when providing the user information on the data source $204_j$; and a data source selected $212_j$ field indicating whether the user has selected to use the data source $204_j$ for search suggestions.

The related information $28_j$ may indicate a field in the data source $24_j$ associated with the search field $208_j$ whose value is rendered when rendering search suggestions from the search field $208_i$ to assist the user in selecting the appropriate search suggestion to use for the search.

Figure 3:
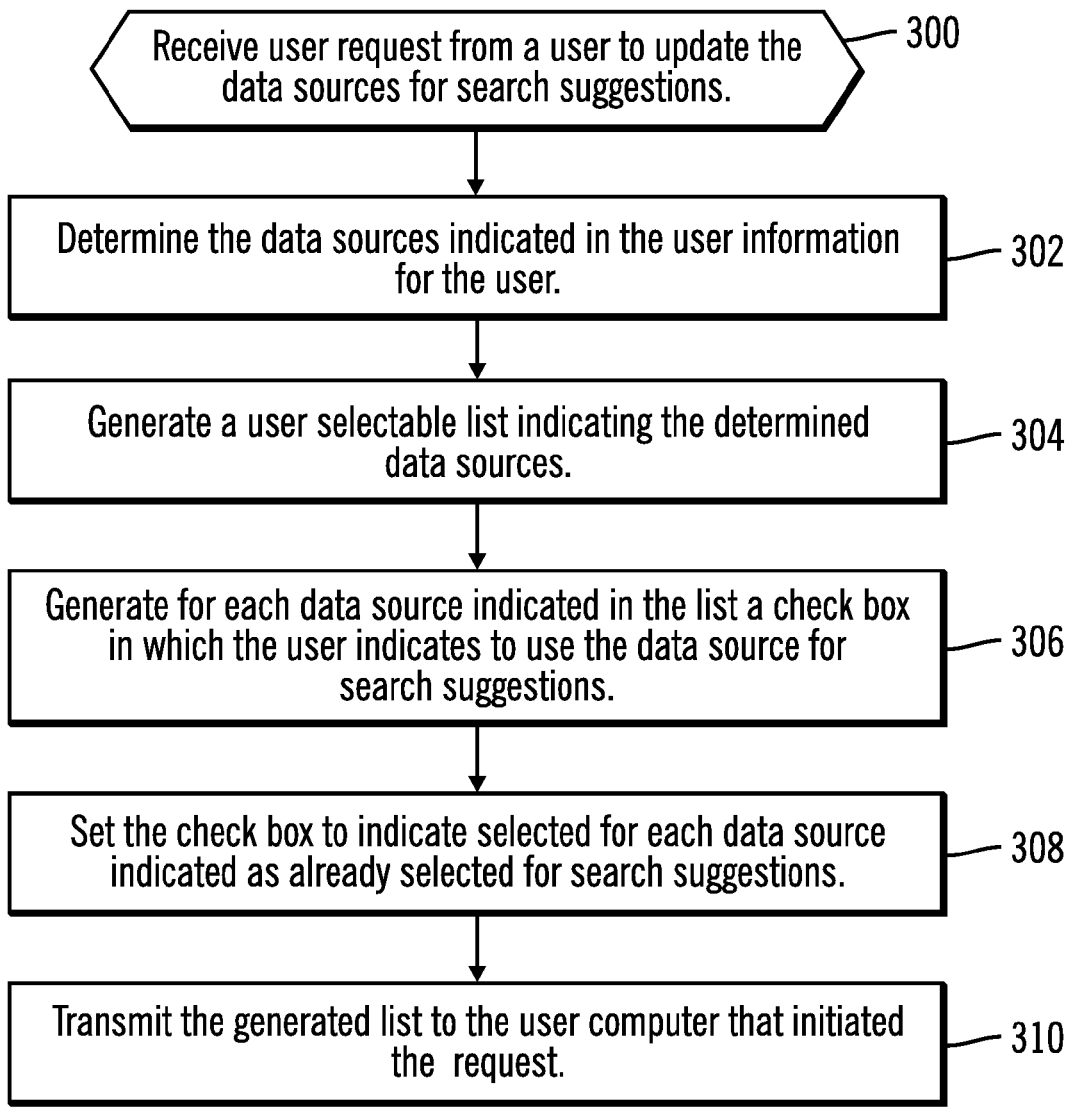
FIG. 3 illustrates an embodiment of operations to process a user request to update data sources for search suggestions.

FIG. 3 illustrates an embodiment of operations performed by the search engine 8 to process a user request to update the data sources 12a, 12b for search suggestions. Upon receiving (at block 300) a user request to update the data sources for search suggestions, the search engine 8 determines (at block 302) the data sources $204_j$ indicated in the user information $200_j$ for the requesting user 202 and generates (at block 304) a user selectable list indicating the determined data sources $204_j$. Previously the user may have entered data source information for the user search settings $200_i$, including $206_j$, $208_j$, $210_j$, and $212_j$. The search engine 8 further generates (at block 306) for each data source $204_j$ a check box or other indicator in which the user may indicate to use the data source $204_j$ for search suggestions. The check box is set (at block 308) to indicate selected for each data source $204_j$ whose data source selected $212_j$ information indicates the data source $204_j$ was selected to use for search suggestions. The data source configuration list is then transmitted (at block 310) to the user computer 2 to render in the user interface 16 as part of a data source configuration page in which the user can manage their data sources.

Figure 4:
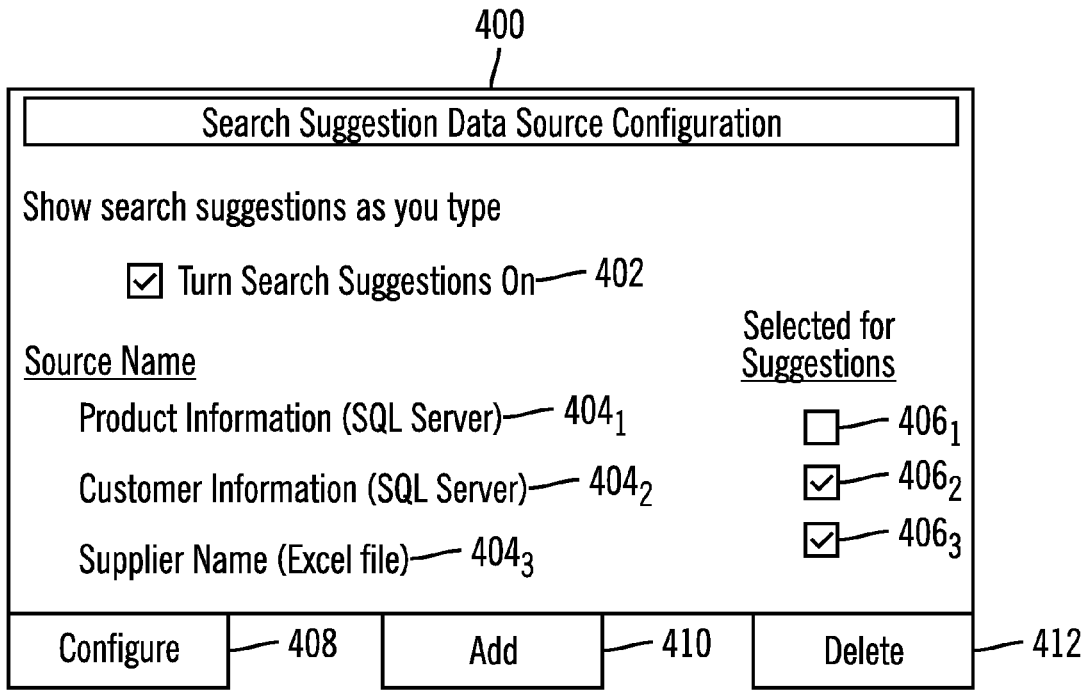
FIG. 4 illustrates an embodiment of a search suggestion data source configuration user interface.

FIG. 4 illustrates an embodiment of the generated data source configuration interface panel 400 including an enable search suggestion box 402 in which the user may indicate whether user selected data sources should be considered for search suggestions. The page 400 further includes the user selectable list of data sources $404_1$, $404_2$, $404_3$, along with the corresponding check boxes $406_1$, $406_2$, $406_3$, which the user may select to indicate whether the corresponding data source is used to provide search suggestions. The configuration page 400 further includes a configure tab 408 which the user selects to provide specific configurations for a data source $404_1$, $404_2$, $404_3$, including the data source location $206_j$, search field $208_j$, and related information field(s) $210_j$; an add tab 410 in which the user may add data sources $202j$; and a delete tab 412 to enable the user to delete data sources $202_j$.

Figure 5:
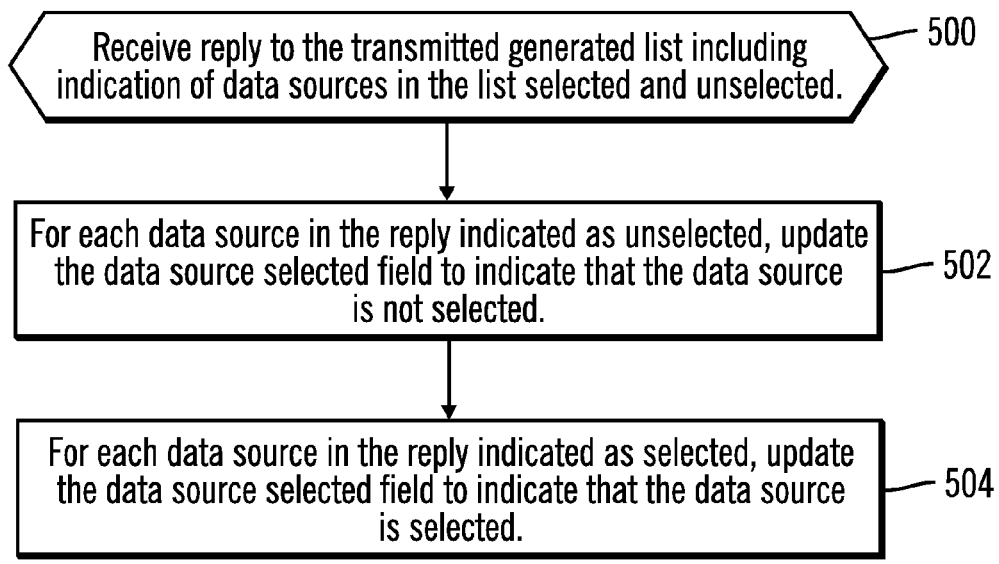
FIG. 5 illustrates an embodiment of operations to process a user reply to the transmitted search suggestion data source configuration.

FIG. 5 illustrates an embodiment of operations performed by the search engine 8 to process a reply to the data source configuration page 400 including user selections of data sources in the check boxes $406_1$, $406_2$, $406_3$. Upon receiving (at block 500) a reply including the returned data source configuration page 400, including indication of data sources $404_1$, $404_2$, $404_3$ in the data source configuration page 400 that are selected or unselected, the search engine 8 updates (at block 502) the data source selected $212_j$ field to indicate that the data source $204_j$ is not selected for each data source $404_1$, $404_2$, $404_3$ in the reply indicated as unselected, e.g., the check box $406_1$, $406_2$, $406_3$ is unselected. For each data source $404_1$, $404_2$, $404_3$ in the reply page 400 indicated as selected, e.g., the check box $406_1$, $406_2$, $406_3$ is selected or marked, the search engine 8 updates (at block 504) the data source selected $212_j$ field to indicate that the data source $204_j$ is selected.

Figure 6:
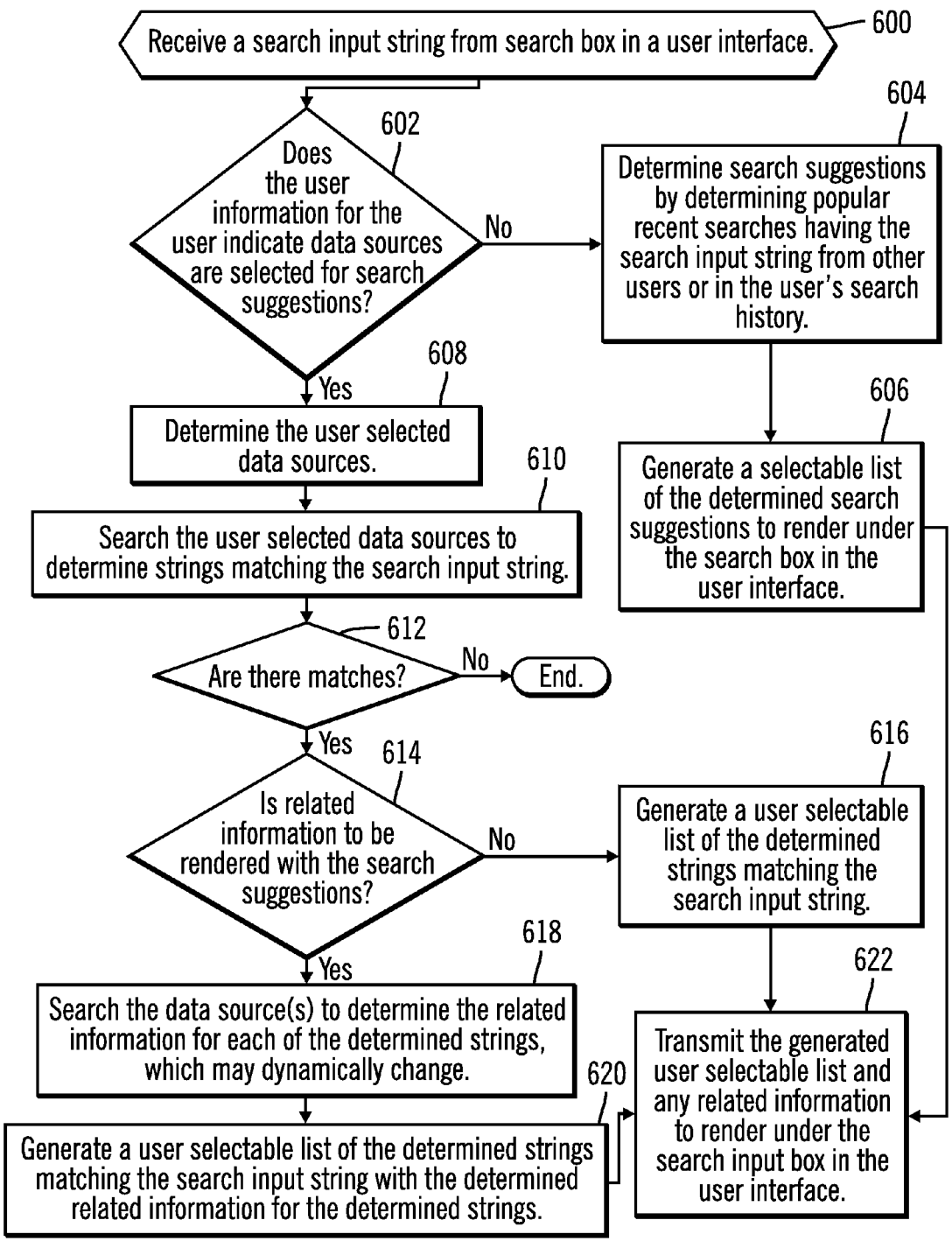
FIG. 6 illustrates an embodiment of operations to process a search input string entered in a user interface.

FIG. 6 illustrates an embodiment of operations performed by the search engine 8 to process a search input string from a search box from a user. The operation of FIG. 6 may be performed whenever the user enters or removes a character, letter, number or special character, from a search input box rendered in the user interface 16. The user interface 16 may transmit any change to the string being entered in the search input box to the search engine 8 to process. Upon receiving (at block 600) a search input string, which may comprise one or more characters, the search engine 8 determines (at block 602) whether the user information 200, for the user i indicated data sources $204_j$ are selected for search suggestions. If (at block 602) there are no selected data sources, then the search engine 8 may determine (at block 604) search suggestions by determining popular recent searches having the search input string from other users or in the user's search history, and generates (at block 606) a selectable list of the determined search suggestions to render under the search box in the user interface 16.

If (at block 602) there are selected data sources $204_j$, then the search engine 8 determines (at block 608) the user selected data sources $204_j$, i.e., those whose data source selected field $212_j$ indicates that the data source $204_j$ is selected. The user selected data sources $204_j$ are searched (at block 610) to determine items or fields matching the search input string. A match may occur if a stem or substring of a value in the search field $208j$ matches the search input string. If (at block 612) there are no matches, control ends. Otherwise, if there are matching strings in the search field $212_j$ of the user selected data sources $204_j$ a determination is made (at block 614) whether a related information field 210$_j$ indicates related information to be rendered with the search suggestions. If (at block 614) there is no related information to be rendered, then the search engine 8 generates (at block 616) a user selectable list of the determined strings matching the search input string. If (at block 614) there is related information to be provided, then the search engine 8 searches (at block 618) the data source(s) 204$_j$ to determine the related information in the related information fields 210 for each of the determined strings, which may dynamically change. The search engine 8 generates (at block 620) a user selectable list of the determined strings matching (in whole or part) the search input string with the determined related information for the determined strings. After generating the user selectable list at blocks 606, 616, and 620, the search engine 8 transmits (at block 622) the generated user selectable list to the user computer 2 to render the user selectable list and any related information under the search input box displayed in the user interface 16.

Figure 7:
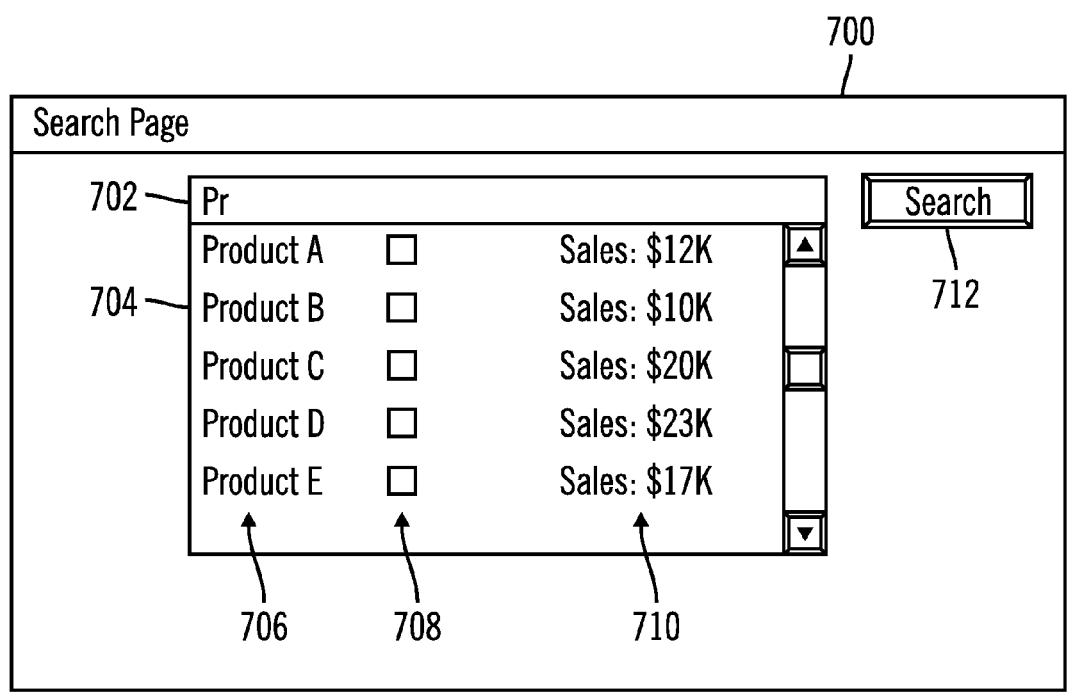
FIG. 7 illustrates an embodiment of a search page.

FIG. 7 illustrates an embodiment of a search page 700 including a search input box 702 in which the user enters a search string, shown as "Pr" by way of example. The search page 700 further renders the user selectable list 704 transmitted by the search engine 8 according to the operations of FIG. 6, which provides a list of determined search suggestions 706, (e.g., names of Products matching the currently entered search string, e.g., "Pr", in the search input box 702), the check boxes 708 enabling the user to select a search suggestion and the related information 710 for the search suggestions. Selecting one or more of the displayed search suggestions 706 causes the selected search suggestions to be included in the search input box 702, e.g., auto-completed. The user may submit the search suggestions added to the search input box 702 to the search engine 8 to search by selecting a search entry button 712.

In the example of FIG. 7, the search suggestions 706 comprise product names from a data source and the related information 710 shows the sales for the product, which the user may consider when selecting a search suggestion. In alternative embodiment, the determined search strings from the data source and related information may comprise any type or category of data.

Upon receiving a selected search suggestion, the search engine 8 may search the search index 10 to determine documents including content matching the search suggestion and then build a search result page indicating network addresses of the matching documents to return the user interface 16.

In the above described embodiments, the search suggestions from user selected data sources were provided in response to a user entering characters for a search string to submit to a search engine to use in a query against a database, such as a document index. However, the described embodiments for providing suggestions from user selected data sources may be provided in response to user input strings entered for computer implemented processes other than a search operation of a database. For instance, the user input string may be entered in text in a word processing document, a text message, email message, and the suggestions may be provided to allow the user to auto-complete a string based on entry of a few characters.

Described embodiments provide techniques to provide search suggestions for a user entered input string by searching one or more user selected data sources for suggestions to provide to complete the string entered by the user. The described embodiments may further provide related information associated with the strings in the data sources to provide with the suggestions to assist the user in selecting a suggestion.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 8:
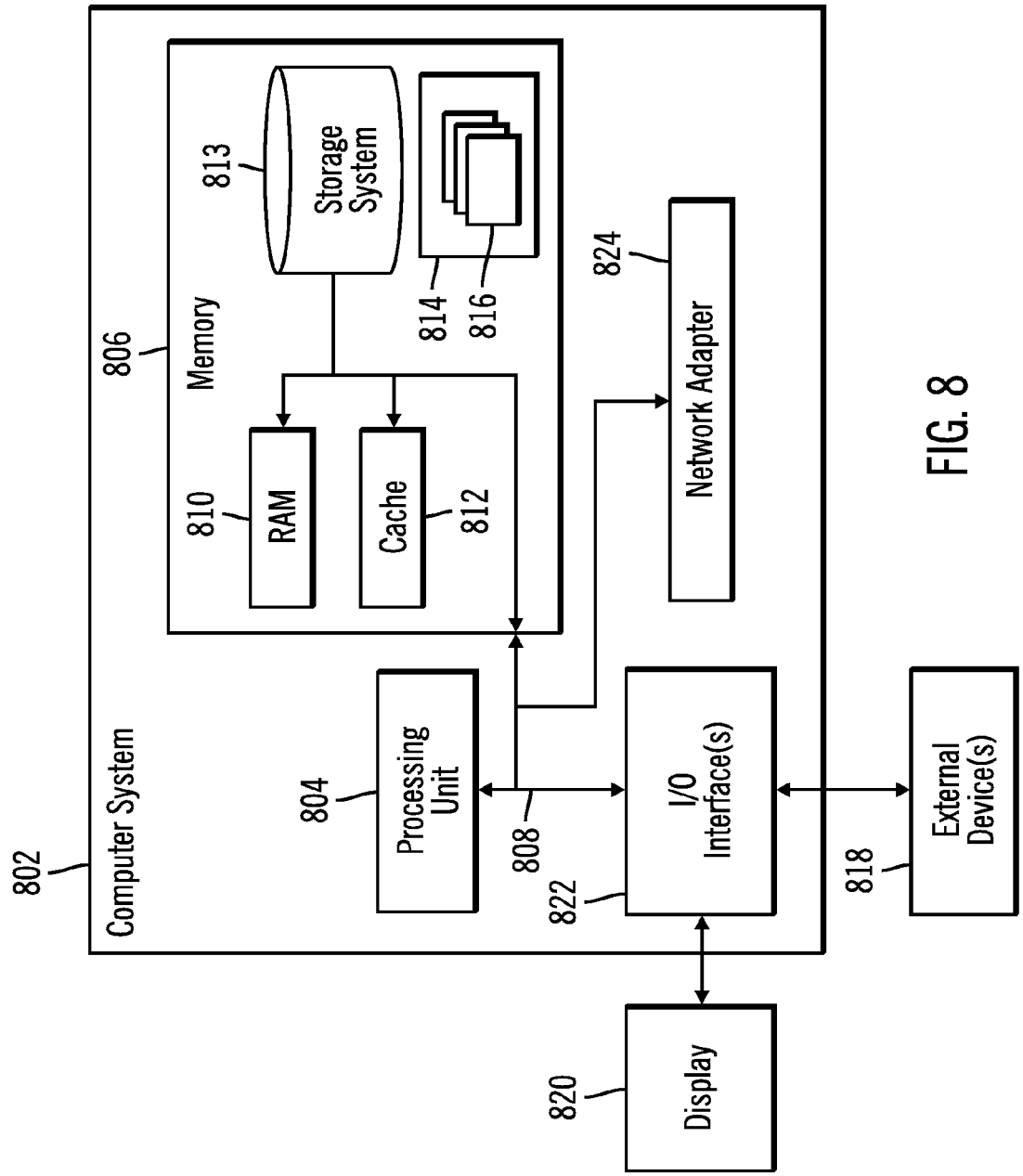
FIG. 8 illustrates an embodiment of a computer system in which embodiments may be implemented.

The search server 6, user system 2, and storage 14a, 14b, and the elements of the social network computing environment of FIG. 1, including the search engine 8, search index 10, user information 200, and the user interface 16, may be implemented in one or more computer systems, such as the computer system 802 shown in FIG. 8. If the components of the network computing environment of FIG. 1 are implemented in multiple systems, then the systems may communicate over the network 4. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 816 which generally carry out the functions and/or methodologies of embodiments of the invention as described herein. The components 12, 14, 16, and 18 of the content analytics system 2 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 12; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for generating suggestions for an input string entered into a computer user interface, comprising:
    determining a user selected data source from user information for a user from which an input string was received from a computer implemented user interface, comprising at least one character for use by a computer implemented process;
    accessing the user selected data source from a location for the user selected data source indicated in the user information; and
    searching the accessed user selected data source to determine strings stored in the user selected data source having at least a substring matching input string;
    providing the determined strings to the computer user interface; and
    receiving selection of one of the determined strings from the computer user interface to provide to the computer implemented process.

2. The method of claim 1, wherein the providing the determined strings comprises providing a selectable list of the determined strings including related information from related information fields providing information on the user selected data source for at least one of the determined strings, wherein the selected one of the determined strings is selected from the selectable list.

3. The method of claim 1, wherein the user selected data source comprises a database, wherein the determined strings comprise data in a field in entries of the database, wherein related information is associated with the fields having the determined strings in the database, and wherein the determining the strings comprises a query of the database to search the field for entries having strings matching the input string.

4. A method for generating suggestions for an input string entered into a computer user interface, comprising:
    determining strings in a user selected data source having at least a substring matching an input string, from a computer implemented user interface, comprising at least one character for use by a computer implemented process;

providing the determined strings to the computer user interface;

receiving selection of one of the determined strings from the computer user interface to provide to the computer implemented process;

storing information from a user on at least one data source from which search suggestions are determined in user information for the user;

generating a list including the at least one data source indicated in the user information for the user;

receiving user selection of one of the at least one data source indicated in the list; and indicating in the user information each user selected data source as selected to use for suggestions for the input string.

5. The method of claim 1, wherein the providing the determined strings comprises providing a selectable list of the determined strings adjacent to a text box in which the input string is entered, wherein the selected one of the determined strings is selected from the selectable list.

6. The method of claim 5, wherein related information for the determined strings dynamically changes, wherein the related information is obtained by querying a database for the related information associated with the determined strings.

7. The method of claim 1, wherein the determined strings have a substring at a beginning of the string matching the input string.

8. The method of claim 1, wherein the determining the strings comprises determining strings from a plurality of user selected data sources having at least a substring matching the input string.

9. The method of claim 8, wherein the data sources comprise at least one of different databases, different fields within one database, a list of terms, a spreadsheet, and a document.

10. The method of claim 1, wherein the computer implemented process comprises a search engine, wherein the input string is entered to provide search terms to the search engine to perform a search of documents in network devices including the input string being entered, wherein the provided determined strings are to provide search suggestions, further comprising:

using, by the search engine, the selected string in a search operation to find documents in network devices including the selected string.

\* \* \* \* \*